United States Patent Office 3,597,362
Patented Aug. 3, 1971

3,597,362
GENERATION OF LIGHT BY THE REACTION OF ESTERS OF OXALIC-TYPE ACIDS
Laszlo Joseph Bollyky, Stamford, and Michael McKay Rauhut, Norwalk, Conn., assignors to American Cyanamid Company, Stamford, Conn.
No Drawing. Continuation-in-part of application Ser. No. 491,896, Sept. 30, 1965. This application Feb. 28, 1967, Ser. No. 619,140
Int. Cl. C09k 3/00
U.S. Cl. 252—186            7 Claims

ABSTRACT OF THE DISCLOSURE

This invention relates to a process for obtaining chemiluminescent light by reacting an oxalic-type ester with a hydroperoxide in the presence of a solvent and a fluorescent compound, and to compositions incorporating part or all of these materials for the process, and to articles incorporating such compositions.

---

This is a continuation-in-part of application Ser. No. 491,896, filed Sept. 30, 1965, now abandoned.

The present invention relates to novel oxalic acid ester compositons of matter and reactions and to the direct generation of light from chemical energy employing such compositions. By "light" as referred to herein is meant electromagnetic radiation at wavelengths falling between about 330 mμ and 1000 mμ.

The art of generating light from chemical energy, i.e., chemiluminescence, is continually in search of compositions which when reacted substantially improve the intensity and lifetime of light emission as contrasted to known chemiluminescent compositions and reactions. Obviously, improved compositions are constantly in demand for use as signal devices, for area illumination, etc.

The art has known for some time that oxalyl chloride in combination with aqueous (30%) hydrogen peroxide and a fluorescent compound generates a light whose lifetime is very short (on the order of about 8 to 30 seconds) and whose intensity is of little practical utility.

According to a publication by Edward A. Chandross ("Tetrahedron Letters No. 12," pp. 761–765, 1963) the chemiluminescent reaction employing oxalyl chloride may be represented as follows:

(1) 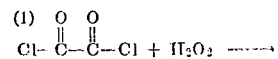

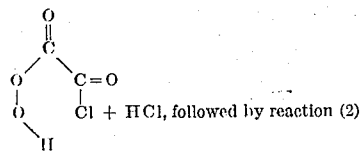

(2) 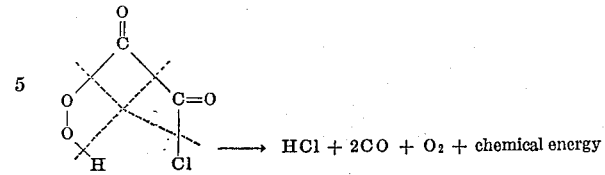

In the above reactions a cyclic transition structure is first formed, followed by a breakdown of the ring into hydrochloric acid, carbon monoxide, oxygen, and chemical energy. It is clear that an essential mechanistic feature of the Chandross reaction, as represented by Chandross, is the splitting out of HCl from a six-membered cyclic transition state.

We have now unexpectedly found that certain other oxalic acid compounds when reacted under certain conditions can unexpectedly provide chemiluminescence.

The mechanism of the oxalyl chloride reaction (as represented by Chandross) is an entirely different and distinct mechanism from that of this invention disclosed herein, as is discussed at length below.

The mechanisms by which chemiluminescent light may be generated are so poorly understood that it is not possible at present to predict those structures which convey the chemiluminescent property. This is amply illustrated by the phthalhydrazide series of compounds, some of which are chemiluminescent and some of which are not chemiluminescent [see A. Bernanose, Bull. Soc. Chim. France, 17,567 (1950)].

It is an object of this invention to obtain a chemiluminescent composition and a process employing said composition whereby a high efficiency may be obtained in the conversion of chemical energy into light.

Another object is to obtain a chemiluminescent compound which produces light over an extended period of time.

Another object of this invention is to obtain a chemiluminescent composition which attains light of substantially higher intensity than has been obtained with former chemiluminescent compositions.

Another object of this invention is to obtain a chemiluminescent composition which may be employed to obtain light by a process which is mechanically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant which when reacted will obtain chemiluminescent light by a process which is not hazardous.

Another object of this invention is to obtain a reaction product formed by the reaction of an oxalic acid ester with a peroxide and a diluent.

We have unexpectedly discovered that the objects of this invention are obtained by admixing (1) an oxalic acid ester or a keto compound of the typical oxalic acid ester structure (as described fully below), (2) a hydroperoxide, (3) a fluorescent compound, and (4) a diluent.

The term "chemiluminescent composition," as used herein, means a mixture of all the ingredients which will result in a reaction to produce chemiluminescence.

The term "chemiluminescent reaction component," as used herein, means a mixture which will result in a chemiluminescent reaction when reacted with other necessary reactants in the processes as disclosed herein.

The term "fluorescent compound," as used herein, means a compound which fluoresces in a chemiluminescent reaction, or a compound which produces a fluorescent compound in a chemiluminescent reaction.

The term "peroxide compound," as used herein, also includes compounds which upon reaction produce the peroxide group.

The term "hydrogen peroxide compound" includes (1) hydrogen peroxide and (2) hydrogen peroxide-producing compounds.

The term "hydroperoxide compound" as used herein is limited to peroxide compounds having at least one HOO— group, or a compound which upon reaction produces a compound with such a group.

The term "peroxidic groups," as used herein, represents HOO—, ROO—, or

R is a substituent such as alkyl, cycloalkyl, α-hydroalkyl, substituted alkyl, for example, and $R^1$ may be R or an aromatic radical.

The term "diluent," as used herein, means a solvent or a vehicle which when employed with a solvent does not cause insolubility.

The term "admixing," as used herein, means "reacting" or sufficiently bringing together component reactants to obtain a chemiluminescent reaction.

The ester suitable for use in applicants' invention includes a large number of compounds of the oxalic-type esters of the typical formula $R^1OCO(CO)_nOR^{11}$, in which $n$ is at least one (1) and in which $R^1$ and $R^{11}$ may be any aliphatic or aromatic groups, either the same or different, including halogen or aromatically substituted compounds. To obtain the optimal and preferred results of this invention, it is critical that the ester reactant be selected from the group consisting of an ester of an alcohol characterized by an acid ionization constant in water greater than $1.3 \times 10^{-10}$. It should be noted that oxalic-type esters of vinyl alcohols fall within the scope of the invention; although vinyl alcohols themselves normally exist as the tautomeric aldehydes, the acidity of the enolic vinyl alcohol tautomer is generally recognized, and esters of such enols are well known. Vinyl esters of oxalic-type acids, however, have not been disclosed previously.

It should be noted that the above acid ionization constant (in water) may be stated in terms of the Hammett sigma value of an unsubstituted or substituted alcohol (conventionally aromatic alcohols), whereby the Hammett sigma value would be greater (positive) than zero for the substituent of a substituted alcohol which is characterized by an acid ionization constant greater than $1.3 \times 10^{-10}$.

Typical organic oxalic-type esters which may be employed are esters such as:

(A) Esters of the following types:

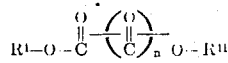

wherein $R^1$ and $R^{11}$ may be:

I. Aryl groups: e.g., phenyl-, naphthyl-, or substituted aryl groups by typical substituents such as:

(a) by halogen: e.g., chlorophenyl-, bromophenyl-;
(b) by acyloxy groups: e.g., benzolyloxyphenyl-;
(c) by carbonyl groups: e.g., formylphenyl-, acetylphenyl-;
(d) by carboxyl groups: e.g., carboxyphenyl-;
(e) by sulfo groups: e.g., sulfophenyl-, 4-sulfonaphthyl-;

II. Heterocyclic groups: e.g., pyridyl-, acridinyl-, or substituted heterocyclic groups by typical substituents such as:

(a) by alkyl groups: e.g., methylpyridyl-;
(b) by halogen groups: e.g., chloropyridyl-;
(c) by acyloxy groups: e.g., acetoxypyridyl-;
(d) by carbonyl groups: e.g., formylpyridyl-;
(e) by carboxyl groups: e.g., carboxypyridyl-;
(f) by alkoxy groups: e.g., methoxyfuryl-;
(g) by amino groups: e.g., triethylammoniumquinolinyl-;
(h) by sulfo groups: e.g., sulfofuryl-;

III. Unsaturated alkyl groups: e.g., vinyl-, ethynyl-, cyclohexenyl-, isopropenyl-, and substituted derivatives thereof, such as halogen, phenyl, cyano, carboxy, and the like substituted groups.

IV. Electronegatively substituted groups: e.g., 1,1,1,3,3,3 - hexafluoro-2-propyl-, 1,1,1,3,3,3-hexachloro-2-cyano-2-propyl-, perfluoro-t-butyl-, dicyanomethyl-, trimethyl-, ammoniummethyl-.

The above vinyl esters of oxalic-type acids obtain the preferred high light intensities of this invention. Included in the group of vinyl oxalic-type esters are (1) the unsubstituted, (2) the substituted, and (3) the cyclic vinyl esters of the above-identified formula. Typical substituted vinyl esters include bis(2-propenyl)oxalate, bis(2-octenyl) oxalate, bis(1-phenyl)vinyl oxalate, and the like. Typical cyclic vinyl esters include 1-cyclohexenyl oxalate, 1-cyclooctenyl oxalate, and the like.

(B) Other oxalic-type esters of alcohols, such as aromatic polyalcohols substituted with substituents having a positive Hammett sigma value:

(a) esters with diols: e.g., substituted nitrocatechol;
(b) cyclic esters with diols: e.g., catechol and substituted catechols;
(c) polymeric esters with diols: e.g., substituted resorcinol; cyanuric acid;
(d) esters with alcohols which are fluorescent: 2-naphthol-3,6,8-trisulfonic acid.

The peroxide employed in the compositions and process of this invention may be obtained from any suitable peroxide compound. For example, the peroxide may be employed as sodium peroxide. Alternatively, sodium perborate may be placed in aqueous solution whereby a solution of hydrogen peroxide is obtained. Obviously, hydrogen peroxide or its solution may be employed and it is the preferred peroxide compound. Although the presence of water and/or base is critical in order to obtain the preferred optimum maximum-intensity chemiluminescence in certain embodiments of this invention, the peroxide employed may be obtained from anhydrous hydrogen peroxide compounds such as perhydrate of urea (urea peroxide), perhydrate of pyrophosphate (sodium pyrophosphate peroxide), pyrohydrate of histidine (histidine peroxide), sodium perborate, and the like. Still another form in which the anhydrous $H_2O_2$ may be provided in the composition is that of an anhydrous solution of $H_2O_2$ in a suitable solvent such as an ether, an ester, an aromatic hydrocarbon, etc., of the type which would provide a suitable diluent for the composition of this invention. Whenever hydrogen peroxide is contemplated to be employed, any suitable compound may be substituted which will produce hydrogen peroxide.

The peroxide concentration may range from about 15 molar down to about $10^{-5}$, preferably about 2 molar down to about $10^{-4}$ molar. The ester of this invention may be added as a solid or in admixture with a suitable solid peroxide reactant or in a suitable diluent, or alternatively dissolved directly in a solution containing the peroxide reactant.

Typical diluents within the purview of the instant discovery are those that do not readily react with a peroxide, such as hydrogen peroxide, and which do not readily react with an ester of oxalic acid.

Although the addition of water is not necessary for the production of chemiluminescent light in certain embodiments according to the present invention, water can serve as the diluent or partial diluent. The term "water," as used herein, includes water-producing compounds such as hydrates. Small amounts of water increase the reaction rate without seriously decreasing the efficiency. In addition, however, either one or more diluents may be included with or in the place of the water, as long as the peroxide employed is at least partially soluble in the diluent(s), such as, for example, at least one tenth gram of $H_2O_2$ per liter of diluent. The following are illustrative of the additional diluents or solvents which may be employed: non-cyclic or cyclic ethers such as diethyl ether, diamyl ether, diphenyl ether, anisole, tetrahydrofuran, dioxane, and the like; esters such as ethyl acetate, propyl formate, amyl acetate, dimethyl phthalate, diethyl phthalate, methyl benzoate, and the like; aromatic hydrocarbons, such as benzene, xylene, toluene, tetrachloroethane, chlorobenzene, chlorinated polyphenyls, dibutylcellosolve and the like. In some instances, it may be desirable to use a water immiscible solvent like dimethyl phthalate, where the chemiluminescent reaction is in contact with water, such as in an underwater application or floating on water application. Solvent mixtures may be desirable to dissolve both ester and $H_2O_2$. For example, benzene might be used as solvent for the ester-containing chemiluminescent component and dimethyl phthalate might be used as solvent for the hydrogen peroxide-containing component where on combining the components all reactants would be solvable in the combined solvent mixture.

Where the esters in its natural state is liquid, it can serve as its own diluent, as with for example bis(1,1,1,3,3,3-hexafluoro-2-propyl)oxalate.

The fluorescent compounds contemplated herein are numerous; and they may be defined broadly as those which do not readily react on contact with the peroxide employed in this invention, such as hydrogen peroxide; likewise, they do not readily react on contact with the ester of oxalic acid. Typical suitable fluorescent compounds for use in the present invention are those which have a spectral emission falling between 330 millimicrons and 1000 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, naphthacene, substituted naphthacene, pentacene, substituted pentacene, and the like. Typical substituents for all of these are phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well known in the art. Many of these are fully described in "Fluorescence and Phosphorescence," by Peter Pringsheim, Interscience Publishers, Inc., New York, N.Y., 1949. Other fluorescers are described in "The Colour Index," second edition, volume 2, The American Association of Textile Chemists and Colorists, 1956, pp. 2907–2923. While only typical fluorescent compounds are listed hereinabove, the person skilled in the art is fully aware of the fact that this invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release. Also, a fluorescent ester such as the oxalic acid ester of 2-naphthol-3,6,8-trisulfonic acid does not require a separate fluorescent compound to obtain light. Other typical fluorescent oxalic acid esters include esters of oxalic acid (1) 2-carboxyphenyl, (2) 2-carboxy-6-hydroxyphenol, (3) 1,4-dihydroxy-9,10-diphenylanthracene, and (4) 2-naphthol. Thus, a reactant including a fluorescent oxalic-type ester would thereby include at least one fluorescent compound.

It has been found that the molar (moles per liter of diluent) concentrations of the major components of the novel composition herein described may vary considerably. It is only necessary that components be in sufficient concentration to obtain chemiluminescence. The ester of oxalic acid molar concentration normally is in the range of at least about $10^{-7}$ to 5 molar or greater, preferably in the range of at least about $10^{-4}$ to about 1 molar; the fluorescent compound is present in the range from about $10^{-5}$ to 5, prefreably $10^{-4}$ to $10^{-1}$ molar. The optimum ratio of $H_2O_2$ to ester is about 1:5 to 5:1; and the water or other diluent must be present in a sufficient amount to form at least a partial solution of the reactants involved in the chemiluminescent reaction. The ester may serve as either the sole diluent or a partial diluent.

The order of admixing of the ingredients of the composition of this invention is not critical. Thus, they may be admixed in a single stage or in a sequence of steps of admixing the separate ingredients. Accordingly, alternative reaction components may be prepared which contain less than all of the necessary ingredients and which may be stored over a period of time and which may be admixed with the final ingredient at a time when the chemiluminescent lighting is desired. It is only necessary that the reactants which enter into the energy release reaction be prevented from reacting, either by keeping them separate or in a condition in which they do not react during storage. Thus, for example, one such component would be a mixture which includes an oxalic acid ester and a fluorescent compound but which does not include a peroxide compound. Another alternative component would be a mixture which includes the fluorescent compound and a peroxide, but which does not include the oxalic acid ester. Another alternative component would be a solid mixture which includes a solid oxalic-type ester and a solid hydroperoxide compound, and possibly additionally includes a solid fluorescent compound, but which does not include a diluent. Obviously, the preferred components which would be less than all necessary components to produce a chemiluminescent light would be those which would be substantially stable to a practical degree over an extended period of time; otherwise, there would be no real advantage in forming a chemiluminescent reaction component to be employed in a subsequent chemiluminescent reaction.

Although we have indicated previously that in the process of obtaining chemiluminescent light according to this invention, it is normally not necessary to employ a specific order or sequence of steps in the adding of the individual ingredients of the inventive chemiluminescent composition, it has been found that the fluorescent component preferably should be already in the reaction mixture at the time of addition of the last component necessary to bring about the chemical reaction and the concurrent release of chemical energy, or should be added soon thereafter to obtain the optimum quantum light yield.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction.

The chemiluminescent emission spectrum is always essentially the same as the fluorescence spectrum of the fluorescer. Thus, the color can be selected on this basis of the fluorescent color of the fluorescent component.

Additionally, it has been found that the superior intensity of chemiluminescence is obtained when the final mixture producing the luminescence is maintained at a temperature of between about −40° C. and 75° C., preferably between about 0° C. and 50° C. However, temperature is not critical and the luminescence of applicants' process is not limited to these ranges.

Additionally, the chemiluminescent light intensity may be increased when a base in an amount sufficient to produce a basic pH is used in the composition and process, but the lifetime is thereby decreased. The longest lifetime is obtained under about neutral conditions. Any suitable base which does not interfere with the chemiluminescent composition and process of this invention may be employed, and contemplated are wide varieties of organic and inorganic bases, typical bases being: sodium hydroxide, potassium hydroxide, potassium tertiary butoxide, sodium ethoxide, sodium methoxide, ammonium hydroxide, tetrabutyl ammonium hydroxide, and triphenyl methide; Lewis bases, including pyridine, triethylamine, quinoline, and the like; etc.

The composition and the process which obtain chemiluminescent light may optionally employ a weak acid, e.g. acetic, in an amount sufficient to produce an acidic pH. However, the presence of acid is not essential to obtain chemluminescence.

The lifetime and the intensity of the chemiluminescent light can be regulated by the use of certain regulators such as:

(1) By the addition of base to the chemiluminescent composition. Both the strength and the concentration of the base are critical for purposes of regulation.

(2) By the variation of hydroperoxide. Both the type and the concentration of hydroperoxide are critical for the purposes of regulation.

(3) By the addition of water.

(4) By the addition of a catalyst which changes the rate of reaction of hydroperoxide with the oxalic-type ester. Catalysts which accomplish that objective include those described in M. L. Bender, "Chem. Revs.," vol. 60, p. 53 (1960).

In the practice of the above process, to obtain chemiluminescent light, a peroxide such as hydrogen peroxide reacts with the ester of an oxalic acid to produce a series of intermediate compounds which produces the chemiluminescent light in the presence of a fluorescer it being understood that a solvent is present for reactants. The mechanism of applicants' invention, i.e., the reactions and the intermediate products, is believed to be as represented by the following equations:

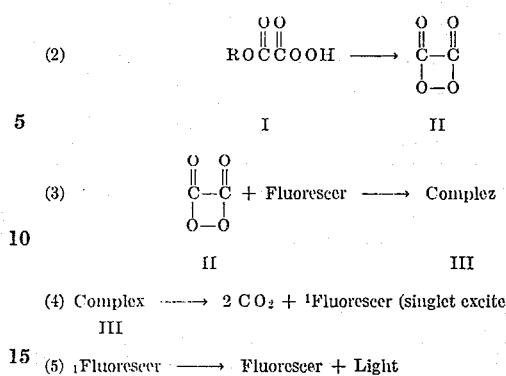

It is clear that no apparent relationships exist between the mechanism of this invention, as represented above, and the mechanism of oxalyl chloride as represented by Chandross, discussed above at length.

Although the above reactions are believed to be the mechanism by which applicants' invention produces chemiluminescent light, the invention disclosed herein is not to be restricted to this theory, except as limited in the appended claims.

Pursuant to the present invention disclosed herein, very intense light is generated and the light emissions last anywhere from an instantaneous and momentary emission to more than 100 times longer than that of the art-known aqueous compositions described hereinbefore, such as oxalyl chloride. The rate can be regulated as might be desired for any particular situation with the present invention.

We have found that Reactions 1 and 2 occur upon the admixing of the ester with the hydroperoxide and that the fluorescer is caused to emit light as in Equations 3, 4, and 5 when it is present. As previously indicated, the ingredients may be admixed in any order to obtain chemiluminescence. We have further surprisingly found that we can admix the ester and hydrogen peroxide and obtain Reactions 1 and 2 without the presence of a fluorescer. The ester is reacted after a relatively short time. Nevertheless, the fluorescer may still be added and Reactions 3, 4, and 5 occur to give light.

The following examples are intended to illustrate the present invention and are in no way intended to limit the invention except as limited in the appended claims.

EXAMPLE 1

Test experiments in which esters of oxalic acid are examined for chemiluminescence are given in the following table.

The tests obtaining the data of Table I were carried out as follows:

(A) Approximately 3–5 mg. of the compound to be tested is added to a 5 ml. solution of about 1 mg. DPA(9,10-diphenylanthracene) and 0.2 ml. anhydrous $H_2O_2$ in anhydrous 1,2-dimethoxyethane maintained at 25° C.

(B) Approximately 3–5 mg. of the compound to be tested is added to a 5 ml. slurry of 1 mg. DPA, 0.2 g. KOH (1 pellet) and 0.2 ml. anhydrous $H_2O_2$ in anhydrous 1,2-dimethoxyethane maintained at 25° C.

(C) As test A except that approximately 0.1 ml. water was added prior to the addition of the compound being tested.

(D) Approximately 3–5 mg. of the compound to be tested is added to a 5 ml. solution of about 1 mg. DPA in 1,2-dimethoxyethane containing 5% water at 25° C. About 5 mg. $Na_2O_2$ is added immediately.

(E) Approximately 3–5 mg. of the compound to be tested is added to a 5 ml. solution of 1 mg. DPA and 0.2 ml. CH₃SO₃H in 1,2-dimethoxyethane containing 5% water and maintained at 25° C. About 0.5 ml. 30% H₂O₂ is added immediately.

Qualitative intensities are based on the oxalyl chloride, hydrogen peroxide reaction taken as strong (S). Other designations are M=medium; W=weak; VW=very weak, barely visible. However, the "lifetime" of the chemiluminescence obtained usually exceeds by many-fold the lifetime obtainable with the oxalylchloride hydrogen peroxide system.

TABLE I.—QUALITATIVE CHEMILUMINESCENCE TEST OF OXALIC ESTERS

| Compound | Tests | | | | |
|---|---|---|---|---|---|
| | A (Anhydrous $H_2O_2$) | B ($H_2O_2$+ KOH) | C ($H_2O_2$+ $H_2O$) | D ($Na_2O_2$) | E ($H_2O_2$+ $H_3O^+$) |
| I. diphenyl oxalate | VW | M | W | W | VW |
| II. 4-nitrophenyl oxalate | W | M | MS | W | W |
| III. 2,4-dinitrophenyl oxalate | MS | S | M | W | MS |
| IV. 2,4,6-trinitrophenyl oxalate | M | MS | None | None | MW |
| V. 4-cyanophenyl oxalate | MW | M | M | VW | None |
| VI. 4-acetylphenyl oxalate | VW | M | VW | VW | W |
| VII. 3-methoxy-4-formylphenyl oxalate | MW | MS | VW | VW | VW |
| VIII. 4-phenylphenyl oxalate | VW | M | VW | None | None |
| IX. 1,2-phenylene oxalate | W | W | W | None | None |
| X. 2-naphthyl oxalate | VW | VW | VW | VW | W |
| XI. phenyl, diphenylmethyl oxalate | VW | VW | None | None | None |

TABLE I.—Continued

| | | Tests | | | | |
|---|---|---|---|---|---|---|
| | | A | B | C | D | E |
| | Compound [1] | (Anhydrous H₂O₂) | (H₂O₂+ KOH) | (H₂O₂+ H₂O) | (Na₂O₂) | (H₂O₂+ H₃O⁺) |
| XII |  4-methoxyphenyl oxalate | None | VW | VW | None | None |
| XIII | 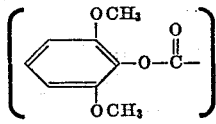 2,6-dimethoxyphenyl oxalate | None | VW | None | None | None |
| XIV | 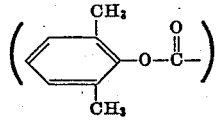 2,6-dimethylphenyloxalate | None | VW | None | None | None |
| XV | 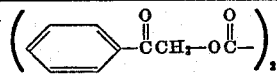 phenacyl oxalate | None | VW | None | None | None |
| XVI | 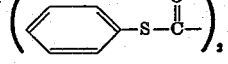 diphenyl thio-oxalate | None | W | VW | None | None |
| XVII | [(C₆H₅)₂CH—O—C(=O)—]₂ diphenylmethyl oxalate | None | VW | None | None | None |
| XVIII | (CH₃—O—C(=O)—)₂ dimethyl oxalate | None | VW | | None | None |
| XIX | (CH₃—CH₂—O—C(=O))₂ diethyl oxalate | None | VW | | VW | None |
| XX | 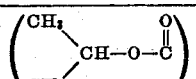 di-i-propyl oxalate | None | W | | VW | None |

[1] The compounds identified as III, IV, V, VI, VII, VIII, and IX are new compounds and are a part of this invention.

This example illustrates that:

(1) Both aryl and alkyl oxalate are chemiluminescent at certain reaction conditions.

(2) Where the substituent of the substituted (i.e., such as nitro-, cyano-, etc.) aryl oxalates have a positive Hammett sigma value,* in general, superior chemiluminescence is observed; whereas when a negative sigma value exists, as from the substituted (i.e., such as methoxy-, methyl-, etc.) aryl oxalates in general are poorly chemiluminescent.

(3) Chemiluminescence of positively substituted aryl oxalates is observed (see Test A) in the absence of added water. Therefore, water is not an essential component of the chemiluminescent system.

*(1) L. P. Hammett: "Physical Organic Chemistry," McGraw-Hill Book Co., Inc., New York, 1940, pp. 184–199; and (2) H. H. Jaffe: Chemical Reviews, 53, 191 (1953).

(4) Chemiluminescence is normally observed (see Test B) to be augmented by the addition of a base in the case of most alkyl or aryl oxalate, and is frequently augmented by the addition of water.

(5) Small amounts of water normally may be present (see Test C) in the chemiluminescent system.

(6) Chemiluminescence of aryl oxalate is normally observed (see Test E) in acidic reaction media.

EXAMPLE 2

Test A described in Table I is repeated with 2,4-dinitrophenyl oxalate. Identical medium-strong chemiluminescence is observed whether the last component added to the chemiluminescent system is 2,4-dinitrophenyl oxalate or hydrogen peroxide or 9,10-diphenylanthracene.

Thus chemiluminescence is obtained by any order of mixing the reagents.

EXAMPLE 3

Test A described in Table I is repeated with 2,4-dinitrophenyl oxalate at three different temperatures as follows:

TABLE II

| Temperature °C.: | Chemiluminescence [1] observed |
|---|---|
| 0 | MW |
| 25 | MS |
| 65 | S |

[1] Refer to the ratings for Table I.

Thus, chemiluminescence is observed in a broad temperature range.

EXAMPLE 4

Test A described in Table I is carried out with 2,4-dinitrophenyl oxalate in the following solvents using sodium fluorescein in the place of 9,10-diphenylanthracene.

TABLE III

| Solvent: | Chemiluminescence [1] |
|---|---|
| 100% water | None |
| 95% water—5% 1,2-dimethoxyethane | VW |
| 75% water—25% 1,2-dimethoxyethane | W |
| 50% water—50% 1,2-dimethoxyethane | M |
| 25% water—75% 1,2-dimethoxyethane | W |

[1] Refer to the ratings for Table I.

Thus, chemiluminescence is observed when water is present up to about 95% of the total solution.

EXAMPLE 5

Tests A and C described in Table I are repeated with 2,4-dinitrophenyl oxalate using various peroxides in the place of hydrogen peroxide. Results are given in Table IV.

TABLE IV

| Peroxide | Test A | Test C |
|---|---|---|
| Hydrogen peroxide ($H_2O_2$) | MS | M. |
| t-Butylhydroperoxide ($C_4H_9$—OOH) | W | MW. |
| di-t-Butylperoxide ($C_4H_9$—OO—$C_4H_9$) | None | None. |
| Perlauric acid ($C_{11}H_{23}\overset{O}{\overset{\|}{C}}OOH$) | VW | VW. |
| Benzoylperoxide ($C_6H_5\overset{O}{\overset{\|}{C}}OO\overset{O}{\overset{\|}{C}}C_6H_5$) | None | None. |

Thus, chemiluminescence is observed when the hydrogen peroxide is replaced by a hydroperoxide or a peracid in the chemiluminescent system, both in the presence and in the absence of water. No chemiluminescence is observed when a dialkyl or diaryl peroxide is used similarly.

EXAMPLE 6

In this example, a number of organic peroxide compounds were compared in differing concentrations. The results are shown in Table V which also includes an illustration of hydrogen peroxide. The results show that organic peroxide compounds are effective chemiluminescent ingredients.

TABLE V.—CHEMILUMINESCENCE FROM DNPO AND ORGANIC PEROXIDES [a]

| Peroxide | Mole $l^{-1} \times 10^2$ | Additive | mole $l^{-1}$ | Quantum yield (percent)[f] | $t_1/4 I_{max}$ [b] (min.) |
|---|---|---|---|---|---|
| $H_2O$ | 8.2 | None | | 7.3 | 14 |
| $(CH_3)_3COOH$ | 2.0 | None | | (c) | |
| | 20.0 | do | | 0.011 | 23 |
| | 20.0 | $H_2O$ | 0.37 | 0.010 | 17 |
| | 20.0 | $(C_2H_5)_3N$ | $1.0 \times 10^{-5}$ | 0.008 | 19 |
| | 20.0 | $CH_3SO_3H$ | $1.0 \times 10^{-2}$ | (c) | |
| H OOH (naphthalene structure) | 2.0 | None | | 0.005 | 15 |
| | 10.0 | do | | 0.008 | 18 |
| | 10.0 | $H_2O$ | 0.18 | | 6 |
| | 10.0 | $(C_2H_5)_3N$ | $1.0 \times 10^{-6}$ | 0.011 | 5 |
| OH OOH (biphenyl-O—O structure) | 2.0 | None | | 2.1 | 48 |
| | 5.8 | do | | 0.92 | 29 |
| | 5.8 | $H_2O$ | 0.18 | 1.0 | 10 |
| | 5.8 | $(C_2H_5)_3N$ | $3.0 \times 10^{-5}$ | 0.8 | 6 |
| $C_6H_5\overset{O}{\overset{\|}{C}}OOH$ | 10.0 | None | | 0.0029 | 3 |
| | 10.0 | $H_2O$ | 0.4 | (c) (d) | |
| | 10.0 | $(C_2H_5)_3N$ | $3.0 \times 10^{-4}$ | (d) | <1 |
| $O_2NC_6H_4\overset{O}{\overset{\|}{C}}OOH$ | 0.7 | None | | (c) | |
| | 0.7 | $(C_2H_5)_3N$ | $1.0 \times 10^{-3}$ | 0.0013 | 2 |
| | 0.7 | $CH_3SO_3H$ | $1.0 \times 10^{-2}$ | (c) | |
| $C_6H_5\overset{OOH}{\overset{\|}{C}}-N=NC_6H_5$ | 1.0 | None | | $1.0 \times 10^{-5}$ | 1.3 |
| | 1.0 | $H_2O$ | 0.4 | $1.0 \times 10^{-5}$ | 1.3 |

[a] Reactions carried out with bis(2,4-dinitrophenyl)oxalate (DNPO)=$1.0 \times 10^{-2}$ M, 9,10-diphenylanthracene (DPA)=$4.16 \times 10^{-4}$ in dimethyl phthalate (DMP) solution at 25° C.
[b] Time required for maximum intensity to decay to ¼ maximum intensity.
[c] Too weak to measure.
[d] Too fast to measure.
[e] The fluorescer was Calcofluor Yellow 7G® $4.2 \times 10^{-4}$ M in DMP.
[f] Quantum yield in Einsteins of light$\times 10^2$ per mole of ester.

EXAMPLE 7

In this example, the effect of hydrogen peroxide concentration on a DNPO chemiluminescent system was evaluated. The results are summarized in Table VI.

TABLE VI.—EFFECT OF HYDROGEN PEROXIDE CONCENTRATION ON DNPO CHEMILUMINESCENCE [a]

| [DNPO] (M×10³) | [H₂O₂] (M×10³) | $I_{max}$.[b] ft. lambert | $t\frac{1}{4} I$ [c] (min.) | $t\frac{3}{4} R$ [d] (min.) | Emitted light (Einstein ×10³) | Quantum yield [e] (Einstein mole⁻¹×10²) |
|---|---|---|---|---|---|---|
| 1.00 | 0.21 | 0.02 | 27.0 | 41.9 | 0.030 | [f] 15 |
| 1.00 | 0.52 | 0.07 | 23.4 | 49.8 | 0.086 | [f] 17 |
| 1.00 | 0.77 | 0.08 | 26.8 | 51.6 | 0.112 | [f] 15 |
| 1.00 | 1.03 | 0.09 | 29.0 | 39.5 | 0.129 | 13 |
| 1.00 | 1.03 | 0.09 | 22.0 | 58.2 | 0.116 | 12 |
| 1.00 | 1.29 | 0.15 | 17.8 | 29.0 | 0.129 | 13 |
| 1.00 | 1.55 | 0.20 | 9.8 | 37.1 | 0.138 | 14 |
| 1.00 | 2.07 | 0.20 | 14.2 | 29.0 | 0.154 | 15 |
| 1.00 | 2.07 | 0.25 | 9.6 | 28.4 | 0.149 | 15 |
| 1.00 | 2.58 | 0.22 | 7.7 | 39.0 | 0.141 | 14 |
| 1.00 | 5.16 | 0.62 | 2.8 | 13.3 | 0.139 | 14 |
| 10.00 | 2.00 | 0.30 | 3.7 | 41.5 | 0.20 | [f] 10 |
| 10.00 | 5.40 | 1.87 | 2.1 | 86.9 | 0.55 | 10 |
| 10.00 | 11.1 | 1.10 | 2.6 | 165.3g | 0.81 | 8.1 |
| 10.00 | 24.1 | 1.28 | 2.8 | 54.4g | 0.85 | 8.5 |
| 10.00 | 37.8 | 2.18 | 2.5 | 35.7 | 0.81 | 8.1 |
| 10.00 | 50.0 | 1.56 | 2.7 | 34.2 | 0.79 | 7.9 |

[a] Reaction was carried out with 6×10⁻⁴ M 9,10-diphenylanthracene in dimethylphthalate at 25° C.
[b] Maximum intensity.
[d] Time required for the decay of intensity to ¼ the maximum.
[c] Time required for the emission of ¾ total light emission.
[e] Quantum yield based on DNPO except where noted.
[f] Quantum yield based on H₂O₂.

EXAMPLE 8

Quantitative measurements of the 2,4-dinitrophenyl oxalate-hydrogen peroxide - 9,10 - diphenylanthracene (DPA) chemiluminescent system are carried out in dimethylphthalate solution by the means of a radiometer-spectrophotometer. The results of the measurements are summarized in Table VII.

EXAMPLE 9

In this example the effect of rubrene as a fluorescer in differing concentrations was evaluated in the DNPO—H₂O₂ chemiluminescent system. The results are shown in Table VIII.

TABLE VII.—CHEMILUMINESCENCE DATA FOR THE BIS-2,4-DINITROPHENYL OXALATE (DNPO)—HYDROGEN PEROXIDE—DPA SYSTEM IN DIMETHYL PHTHALATE SOLUTION [a]

| (DNPO) mole l⁻¹ | (H₂O₂) mole l⁻¹ | H₂O₂/DNPO | (H₂O) mole l⁻¹ | $t\frac{1}{4}I_{max}$,[b] min. | $I_{max}$, foot lambert | Quantum yield,[d] Einstein mole⁻¹×10² | Radiation capacity, Einstein l⁻¹×10⁴ |
|---|---|---|---|---|---|---|---|
| 0.89×10⁻⁴ | 0.1 | 1,124 | None | 48 | 0.002 | 13.9 | 0.124 |
| 1.11×10⁻² | 0.1 | 90 | do | 13 | .118 | 13.2 | 1.47 |
| 1.11×10⁻² | 0.1 | 90 | do | 11.5 | .121 | 12.2 | 1.36 |
| 1.11×10⁻² | 0.1 | 90 | do | 11.5 | .121 | 12.2 | 1.36 |
| 1.11×10⁻² | 0.1 | 90 | do | 30 | .028 | 10.2 | 1.13 |
| 1.11×10⁻² | 0.1 | 90 | do | 59 | .040 | 10.0 | 1.11 |
| 1.11×10⁻² | 0.1 | 90 | do | 23 | .052 | 10.5 | 1.17 |
| 1.11×10⁻² | 0.01 | 9 | do | 6 | .312 | 12.3 | 1.37 |
| 1.11×10⁻² | 0.5 | 450 | do | 26 | .040 | 8.1 | 0.90 |
| 1.11×10⁻² | 0.1 | 90 | 0.5×10⁻² | 21 | .062 | 11.2 | 1.24 |
| 1.11×10⁻² | 0.1 | 90 | 2.5×10⁻² | 12 | .108 | 12.2 | 1.36 |
| 1.11×10⁻² | 0.1 | 90 | 10.0×10⁻² | 6 | .200 | 10.2 | 1.13 |
| 1×10⁻² | 0.1 | 10 | None | 4 | 3.05 | 7.4 | 7.4 |

[a] DPA (9,10-diphenylanthracene):5×10⁻⁴ mole per liter.
[b] $t\frac{1}{4}I_{max}$=time required for the light intensity to decrease to one quarter of its maximum value.
[c] $I_{max}$=maximum value of emitted light intensity in a 1.0 cm. deep cell.
[d] Based on DNPO.

In reference to the above Table VII, the exceptionally high efficiency of the chemiluminescence (quantum yield 13%) is essentially maintained even at moderately high concentration of 2,4-dinitrophenyl oxalate.

In further reference to the above Table VII, increasing the hydrogen peroxide concentration leads to decreasing efficiency of the chemiluminescent system.

In reference to the above Table VII, the addition of water does not significantly change the efficiency of the chemiluminescence system. However, increasing amounts of water appears to lead to a gradual acceleration of the chemiluminescent reaction.

In further reference to the above Table VII, it is illustrated that the useful lifetime ($tI_{max.}+t\frac{1}{4}I_{max.}$) of the system may be regulated and may be as short as 4 minutes or exceed 1 hour as desired.

TABLE VIII.—THE EFFECT OF RUBRENE CONCENTRATION ON THE DNPO, H₂O₂-CHEMILUMINESCENCE SYSTEM[a]

| Rubrene (moles l⁻¹ 10⁴) | $I_{max}$.[b] (ft. lamberts) | $t\frac{1}{4} I$,[c] min. | $t\frac{3}{4} A$,[d] min. | Quantum yield |
|---|---|---|---|---|
| 1.95 | Decayed too fast to follow | | | 13.3 |
| 2.92 | 310.4 | 1.0 | 1.4 | 17.2 |
| 4.87 | 223.1 | 1.6 | 3.9 | 16.0 |
| 5.84 | 178.7 | 1.9 | 4.0 | 15.2 |
| 7.30 | 178.9 | 1.8 | 3.9 | 13.3 |
| 8.76 | 140.6 | 2.2 | 3.5 | |

[a] The reactions were carried out with 1×10⁻² M DNPO, 5×10⁻² M H₂O₂ in dimethyl phthalate at 25° C.
See footnotes b, c, and d at end of Table V.

EXAMPLE 10

A variety of fluorescent compounds were evaluated as fluorescers for the oxalic type ester-hydrogen peroxide chemiluminescent system. Table IX shows the results and illustrates that a variety of such compounds are suitable in the system.

The results are shown in Table X.

TABLE IX.—CHEMILUMINESCENCE DATA FOR THE BIS-2,4-DINITROPHENYL OXALATE (DNPO)-HYDROGEN PEROXIDE-FLUORESCER SYSTEM IN DIMETHYLPHTHALATE SOLUTION [a]

| Fluorescer | | $t\frac{1}{4}I_{max.}$,[b] min. | $I_{max.}$,[c] foot lambert | Quantum yield, Einstein mole$^{-1}\times 10^2$ | Radiation capacity, Einstein l$^{-1}\times 10^4$ |
|---|---|---|---|---|---|
| Type | Mole l$^{-1}$ | | | | |
| HEB super [d] | $4.1\times 10^{-4}$ | 5.5 | 13.8 | 3.22 | 3.22 |
| Calcofluor Yellow 6-G [d] | $4.2\times 10^{-4}$ | 4.5 | 13.0 | 3.00 | 3.00 |
| Calcofluor Yellow 7-G [d] | $4.1\times 10^{-4}$ | 3.0 | 13.0 | 3.80 | 3.80 |
| 9,10-diphenylanthracene | $5\times 10^{-4}$ | 4.0 | 3.0 | 7.40 | 7.40 |

[a] DNPO ($1\times 10^{-2}$ mole l$^{-1}$; Hydrogen peroxide:0.1 mole l$^{-1}$.
[b] $t\frac{1}{4}I_{max.}$=time required for the light intensity to decrease to one quarter of its maximum value.
[c] $I_{max.}$=maximum value of emitted light intensity.
[d] Dye marketed by American Cyanamid Co.

EXAMPLE 11

In this example, a number of additional fluorescent compounds were used in a chemiluminescent system as follows:

Five ml. of $2\times 10^{-2}$ M bis(2,4-dinitrophenyl)oxalate in dimethyl phthalate is combined with 5 ml. of $2\times 10^{-3}$ M fluorescer in dimethyl phthalate. This solution is treated with hydrogen peroxide so that the final solution is $1\times 10^{-2}$ M in hydrogen peroxide. The light emitted is compared visually with a rubrene standard rated as very strong.

This example shows that a wide variety of fluorescers with varying spectral emissions are useful in the inventive chemiluminescent system. This makes it possible to choose the color of light as desired.

TABLE X

| Organic fluorescer | Color | Light emission |
|---|---|---|
| Rubrene | Yellow | Very strong. |
| 2-hydroxy-4-methoxybenzophenone | Orange | Medium. |
| 2-(o-hydroxyphenyl)-3-methyl-4-(3H) quinazolone. | Yellow | Do. |
| 3,4-dichloro-N-hydroxy-3'-(trifluoromethyl) carbanilide. | do | Do. |
| 4'-nitro-2-stibenol | Green-yellow | Do. |
| 2-(p-nitrostyryl-naphth[1,2-d] oxazole | Yellow | Do. |
| 4-benzoylamino-N-n-butylnaphthalimide. | Blue | Do. |
| Tetraphenylporphine | Red | Do. |
| Zinc tetraphenylporphine | Red | Do. |
| Eosin | Yellow-orange | Do. |
| Rhodamine B | Red | Strong. |
| 6-bromo-1,2-dihydro-2-[6-(methylsulfonyl)-2-benzothiazolyliminio] benz(cd)indole | Yellow | Medium. |
| Bis(2-hydroxy-1-naphthylmethylene) oxalic acid hydrazide. | Green | Do. |
| 2,5 diphenylisoxazole | Blue | Do. |

EXAMPLE 12

In this example a number of oxalate ester compounds were evaluated in an oxalate ester-hydrogen peroxide-fluorescer chemiluminescent reaction. The results are set forth in Table XI.

TABLE XI.—OXALATE ESTER-HYDROGEN PEROXIDE-FLUORESCER CHEMILUMINESCENCE [a]

| Ester | | | Hydrogen peroxide concentration, mole L$^{-1}$ | Additive [b] | | $I_{max.}$,[c] ft. lamberts | $T\frac{1}{4}R$,[d] min. | $T^{1/4}R$,[e] min. | Quantum yield,[f] Einstein mole$^{-1}\times 10^2$ |
|---|---|---|---|---|---|---|---|---|---|
| Name | Concentration, mole L$^{-1}$ | Solvent [a] | | Compound | Concentration, mole L$^{-1}$ | | | | |
| Bis(2,4-dinitrophenyl) oxalate | $1\times 10^{-3}$ | DMP | $2.4\times 10^{-2}$ | | | 0.27 | 9.9 | 10.1 | 16.5 |
| $\left(O_2N-\bigcirc-O-\overset{O}{\underset{\|}{C}}-\right)_2$ (with NO$_2$) | $1\times 10^{-2}$ | DMP | $5\times 10^{-2}$ | | | 223.1 | 1.6 | 3.9 | 17.2 |
| | [e]$1\times 10^{-2}$ | DMP | $1\times 10^{-1}$ | | | 16.5 | 5.0 | | 5.6 |
| | [h]$1\times 10^{-2}$ | DMP | $5\times 10^{-2}$ | BTH | $8\times 10^{-4}$ | 23.4 | 0.7 | 0.8 | 9.2 |
| | $1\times 10^{-2}$ | DMP | $5\times 10^{-2}$ | TEA | $8.3\times 10^{-6}$ | 4.04 | .3 | 3 | 6.9 |
| | $1\times 10^{-2}$ | DMP | $0.9\times 10^{-2}$ | H$_2$O | 0.1 | 3.56 | 4 | 4 | 7.8 |
| | $1\times 10^{-2}$ | DMP | $5\times 10^{-2}$ | (i) | $1\times 10^{-2}$ | 1.50 | 7.7 | 19.0 | 7.6 |
| | $1\times 10^{-2}$ | DMP | $5\times 10^{-2}$ | (j) | $6\times 10^{-2}$ | 4.12 | 2.9 | 6.7 | 7.0 |
| | $1\times 10^{-2}$ | DMP | $5\times 10^{-2}$ | (k) | $6\times 10^{-2}$ | Complete quenching | | | |
| | [e]$1\times 10^{-2}$ | DMP | $2.5\times 10^{-2}$ | TBAP | $1\times 10^{-1}$ | 1485.7 | 0.2 | 0.9 | 23.8 |
| | $1\times 10^{-2}$ | MEK | $7.5\times 10^{-2}$ | | | 1.23 | 2.1 | 5.9 | 1.8 |
| | $2\times 10^{-2}$ | TEP | $4.3\times 10^{-2}$ | | | 0.85 | 10.0 | 35.3 | 2.9 |
| Bis(pentachlorophenyl) oxalate | $1\times 10^{-3}$ | DMP | $7.2\times 10^{-3}$ | | | 0.07 | 34.1 | 72.9 | 15.1 |
| $\left(\bigcirc(Cl_5)-O-\overset{O}{\underset{\|}{C}}-\right)_2$ | $2.7\times 10^{-3}$ | DMP | $9\times 10^{-2}$ | H$_2$O | $2\times 10^{-3}$ | 0.12 | 58.2 | 76.5 | 14.2 |
| | $2.7\times 10^{-3}$ | DMP | $9\times 10^{-2}$ | {H$_2$O, TEA} | {$1\times 10^{-3}$, $1\times 10^{-3}$} | 0.86 | 3.9 | 20.3 | 8.2 |
| Bis(3-trifluoromethyl-4-nitrophenyl) oxalate | $1\times 10^{-3}$ | DMP | $2.4\times 10^{-2}$ | | | 0.04 | 27.0 | 48.7 | 12.3 |
| $\left(O_2N-\bigcirc(CF_3)-O-\overset{O}{\underset{\|}{C}}-\right)_2$ | [e]$1\times 10^{-2}$ | DMP | $2.5\times 10^{-2}$ | H$_2$O | $1\times 10^{-1}$ | 2.8 | 164.5 | 134.9 | 22.0 |
| | $3.3\times 10^{-2}$ | DMP | $9\times 10^{-2}$ | | | 0.18 | 13.0 | 19.7 | 0.50 |
| | $3.3\times 10^{-2}$ | DMP | $9\times 10^{-2}$ | {H$_2$O, TEA} | {$2\times 10^{-3}$, $8.3\times 10^{-6}$} | 0.43 | 5.4 | 24.8 | 0.53 |
| | $1\times 10^{-2}$ | DMP | $2.5\times 10^{-3}$ | TBAP | $1\times 10^{-2}$ | 7.0 | 60.0 | 56.8 | 20.5 |
| | [e]$1\times 10^{-2}$ | TEP | $1.8\times 10^{-2}$ | | | 0.23 | 9.1 | 11.4 | 13.4 |
| | $1\times 10^{-2}$ | TEP | $8.7\times 10^{-2}$ | H$_2$O | $1\times 10^{-1}$ | 1.49 | 6.6 | 11.4 | 6.0 |
| | $1\times 10^{-2}$ | TEP | $8.7\times 10^{-2}$ | TEA | $8.3\times 10^{-6}$ | 1.61 | 4.7 | 10.0 | 4.8 |
| Bis(2,4-dinitro-6-methylphenyl) oxalate | $1\times 10^{-3}$ | DMP | $2.4\times 10^{-2}$ | | | 0.20 | 37.0 | 565.4 | 9.3 |
| $\left(O_2N-\bigcirc(NO_2)(CH_3)-O-\overset{O}{\underset{\|}{C}}-\right)_2$ | $1\times 10^{-2}$ | DMP | $9\times 10^{-2}$ | H$_2$O | $2\times 10^{-3}$ | 0.15 | 15.0 | 330.1 | 5.7 |
| | $1\times 10^{-2}$ | DMP | $9\times 10^{-2}$ | {H$_2$O, TEA} | {$2\times 10^{-3}$, $8.3\times 10^{-6}$} | 2.19 | 2.7 | 88.5 | 5.7 |
| | $1\times 10^{-2}$ | TEP | $2.5\times 10^{-2}$ | | | 181.4 | 1.5 | 3.4 | 17.4 |
| | [e]$1\times 10^{-2}$ | TEP | $2.5\times 10^{-2}$ | TBAP | $1\times 10^{-2}$ | 80.4 | 2.9 | 13.4 | 14.8 |
| | [e]$1\times 10^{-3}$ | PC | $2.3\times 10^{-2}$ | | | 0.59 | 3.7 | 49.5 | 2.44 |
| | $1\times 10^{-2}$ | MEK | $7.5\times 10^{-2}$ | | | <0.01 | 42.5 | 304.5 | 0.63 |

TABLE XI.—Continued

| Ester | | | Hydrogen peroxide concentration, mole L⁻¹ | Additive [b] | | $I_{max}$,[c] ft. lamberts | $T\frac{1}{4}R$,[d] min. | $T^{1}4R$,[e] min. | Quantum yield,[f] Einstein mole⁻¹×10² |
|---|---|---|---|---|---|---|---|---|---|
| Name | Concentration, mole L⁻¹ | Solvent[a] | | Compound | Concentration, mole L⁻¹ | | | | |
| Bis(2,4 dinitro-5,6-dimethylphenyl) oxalate | ᵍ 1×10⁻³ | DMP | 2.4×10⁻² | BTH | 1.6×10⁻⁵ | 2.36 | 3.7 | 16.2 | 14.3 |
| Bis(2,4,6-trichlorophenyl) oxalate | ᵍ 1×10⁻² | DMP | 2.5×10⁻² | | | 5.7 | 2.8 | 339 | 8.5 |
| | ᵍ 1×10⁻² | DMP | 2.5×10⁻² | TBAP | 6.7×10⁻² | 9.6 | 46.3 | 31.8 | 22.0 |
| | ᵍ 1×10⁻² | (ⁱ) | 2.5×10⁻² | TBAP | 6.7×10⁻² | 9.3 | 44.1 | 37.4 | 20.2 |
| | 1×10⁻³ | DMP | 2.4×10⁻² | | | 0.13 | 13.6 | 22.4 | 14.6 |
| | 2.7×10⁻³ | DMP | 9×10⁻² | H₂O | 1×10⁻² | 0.21 | 30.0 | 38.8 | ʲ 2.1 |
| [$K_a$=1×10⁻⁶] | 1×10⁻² | DMP | 2.5×10⁻² | TBAP | 3×10⁻² | 0.80 | 20.2 | 23.2 | 10.15 |
| Bis(pentafluorophenyl) oxalate | 8×10⁻⁴ | DMA | 3.3×10⁻² | | | 0.87 | 1.7 | 4.7 | 11.3 |
| | 8/10⁻⁴ | DMA | 9.9×10⁻² | H₂O | 1×10⁻¹ | 0.71 | 10.0 | 11.6 | 8.4 |
| | 8×10⁻⁴ | DMA | 9.9×10⁻² | TEA | 8.3×10⁻⁶ | 5.78 | 7.0 | 6.5 | 8.7 |
| | 1×10⁻² | DME | 5.2×10⁻² | | | 3.89 | 6.4 | 8.1 | 9.7 |
| Bis(2-formyl-4-nitrophenyl) oxalate | 1×10⁻³ | DMP | 2.4×10⁻² | | | 0.02 | 100.0 | 115.3 | 13.7 |
| | ᵍ 1×10⁻² | DMP | 2.5×10⁻² | | | 7.4 | 36.0 | 90.2 | 14.4 |
| | 1×10⁻² | DMP | 9×10⁻² | H₂O | 2×10⁻³ | 0.21 | 75.0 | 77.7 | 8.0 |
| | 1×10⁻² | DMP | 9×10⁻² | {H₂O, TEA} | {2×10⁻³, 8.3×10⁻⁶} | 0.64 | 20.0 | 27.5 | 7.0 |
| | ᵍ 1×10⁻² | DMP | 2.5×10⁻² | TBAP | 1×10⁻² | 19.0 | 13.6 | 30.0 | 15.2 |
| | 1×10⁻³ | EA | 5.7×10⁻³ | | | 0.19 | 2.9 | 94.1 | 10.5 |
| Bis(3-trifluoromethylphenyl) oxalate | 1×10⁻² | DMP | 2.4×10⁻² | | | <0.01 | 798 | 1,234 | 0.56 |
| | 3.7×10⁻² | DMP | 9×10⁻² | {H₂O, TEA} | {2×10⁻³, 8.3×10⁻⁶} | <0.01 | 177 | 187.4 | 0.15 |
| Bis[3,5 bis(trifluoromethyl)phenyl] oxalate[1] | 3×10⁻² | DMP | 7.3×10⁻² | | | 0.04 | 69.0 | 73.4 | 0.3 |
| | 1×10⁻² | DMP | 2.4×10⁻² | BTH | 4.8×10⁻⁶ | 0.02 | 52.5 | 90.9 | 6.4 |
| Bis(2-nitrophenyl) oxalate[2] | 1×10⁻³ | DMP | 2.4×10⁻² | BTH | 1.6×10⁻⁵ | 0.01 | 84.1 | 76.1 | 5.7 |

2—NO₂ $K_a$=6.8×10⁻⁸
4—NO₂ $K_a$=7×10⁻⁸

| Bis(4-nitrophenyl) oxalate | 6.7×10⁻⁴ | DMP | 0.4 | | | <0.01 | 35 | | 0.93 |
|---|---|---|---|---|---|---|---|---|---|
| | 6.7×10⁻⁴ | DMP | 0.1 | H₂O | 0.4 | <0.01 | 60 | | 1.68 |
| Bis(2,5-dinitrophenyl) oxalate[3] | 1×10⁻³ | DMP | 2.4×10⁻² | | | 0.55 | 2.0 | 1.5 | 5.3 |

$K_a$=7.1×10⁻⁶ ($K_a$ for 2,4 isomer is higher)

| Bis(2,6-dichloro-4-nitrophenyl) oxalate | 1×10⁻² | DMP | 9.7×10⁻² | BTH | 1.6×10⁻⁴ | 0.06 | 228.3 | 377.7 | ʲ 4.4 |

TABLE XI.—Continued

| Ester | | | Hydrogen peroxide concentration, mole L⁻¹ | Additive[b] | | $I_{max}$,[c] ft. lamberts | $T\frac{1}{4}R$,[d] min. | $T\frac{3}{4}R$,[e] min. | Quantum yield,[f] Einstein mole⁻¹×10² |
|---|---|---|---|---|---|---|---|---|---|
| Name | Concentration, mole L⁻¹ | Solvent[a] | | Compound | Concentration, mole L⁻¹ | | | | |
| Bis(2,4-dichlorophenyl) oxalate[4] | 1×10⁻³ | DMP | 2.4×10⁻² | BTH | 1.6×10⁻⁴ | <0.01 | 170 | 137.8 | 4.0 |

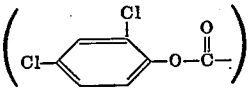

$Ka = 2.4 \times 10^{-8}$

[1] Note that efficiency improves with second CF₃ group.
[2] Note that the 2—NO₂ isomer is better than the 4—NO₂ isomer.
[3] Note that the 2,4 di NO₂ isomer appears superior.
[4] Note that bis(2,4,6-trichlorophenyl) oxalate is superior. Efficiency increases substantially with 3d CL, and so does Ka increase.
[a1] The fluorescer concentration was 5.10×10⁻³ M. 9,10-diphenylanthracene was used as fluorescer except where noted.
[a] DMP=Dimethyl phthalate; DMP=Dimethyl adipate; DME=1,2 dimethoxyethane; TEP=Triethyl phosphate; EA=Ethyl acetate; PC=Propylene carbonate; MEK=Methyl ethyl ketone.
[b] BTH=Benzyltrimethyl ammonium hydroxide; TEA=Triethylamine; TBAP=Tetrabutyl ammonium perchlorate.
[c] Maximum intensity measured in a 1.0 cm. cell.
[d] Time required for light intensity to decay to ¼ of maximum value.
[e] Time required for emission of ¾ of total light.
[f] Quantum yield based on ester.
[g] Rubrene was used as fluorescer.
[h] Calcofluor® yellow 7G used as fluorescer.
[i] Benzoic acid.
[j] Acetic acid.
[k] Trifluoroacetic acid.
[l] Benzene/DMR (1/1 by volume).
[m] Fluorescer was consumed during reaction.

The preparation of certain oxalate ester compounds used in this invention is recited in Examples 13 to 26 which follow. Of these compounds, those of Examples 13, 15, 16, 17, 19, 20, 21, 22, 24 and 26 describe new compounds which are a part of this invention. The properties of the new compounds are summarized in Table XII.

EXAMPLE 13

Bis(2,4 dinitrophenyl) oxalate

A solution of 368.2 g. (2 moles) of 2,4 dinitrophenol in 5 l. of benzene is dried by azeotropic distillation of 1 l. of solvent. The dried solution is cooled to 10° C. under a nitrogen atmosphere and 202.4 g. (2 moles) of freshly distilled triethylamine is added. Oxalyl chloride (139.6 g., 1.1 moles) is added to this mixture during 30 minutes using a cooling bath to maintain the reaction temperature between 10°–25° C.

The resultant yellow slurry is stirred for 3 hours, then evaporated to dryness under reduced pressure. This solid, after mixing with 1 l. of chloroform is collected on a sintered glass funnel, is washed with chloroform and is dried under vacuum.

Recrystallization from nitrobenzene provides 151.3 g. (35.8%) of pale yellow crystals, M.P. 189–192° C.

Analysis.—Calcd. for $C_{14}H_6N_4O_{12}$ (percent): C, 39.82; H, 1.43; N, 13.27. Found (percent): C, 39.97; H, 1.65; N, 13.47.

EXAMPLE 14

Bis(pentachlorophenyl) oxalate

This previously known[1] ester was prepared using the general procedure described for bis(2,4 dinitrophenyl) oxalate in Example 9. The compound, recrystallized from chlorobenzene, M.P. 228–34 (lit. 236–8) was obtained in 65.5% yield.

Analysis.—Calcd. for $C_{14}Cl_{10}O_4$ (percent): C, 28.66; Cl, 60.43. Found (percent): C, 28.60; Cl, 60.67.

EXAMPLE 15

Bis(pentafluorophenyl) oxalate

Pentafluorophenol and oxalyl chloride were reacted using the general procedure described above in Example 9. The ester, obtained in 74% yield (M.P. 170–172°) was recrystallized from methylene chloride.

Analysis.—Calcd. for $C_{14}F_{10}O_4$ (percent): C, 39.83; F, 45.01. Found (percent): C, 39.93; F, 44.71.

[1] J. W. Baker and I. Schumaker, J. Chem. Eng. Data, 9, 584 (1964).

EXAMPLE 16

Bis(2-formyl-4-nitrophenyl) oxalate

The general procedure described above in Example 9 was used to prepare the crude ester which was recrystallized from chlorobenzene. The product, M.P. 213.5–215° C., was obtained in 83% yield.

Analysis.—Calcd. for $C_{16}H_8N_2O_{10}$ (percent): C, 49.50; H, 2.08; N, 7.23. Found (percent): C, 49.28; H, 2.19; N, 7.43.

EXAMPLE 17

Bis(3-trifluoromethyl-4-nitrophenyl) oxalate

The general procedure for preparing oxalate esters described in Example 9 was used. The crude material was recrystallized from methylene chloride to give product, M.P. 186–9°, in 73% yield.

Analysis.—Calcd. for $C_{16}H_6N_2O_8F_6$ (percent): C, 41.04; H, 1.29; N, 5.98; F, 24.35. Found (percent): 41.65; H, 1.37; N, 6.23; F, 24.11.

EXAMPLE 18

Bis(2,4,6-trichlorophenyl) oxalate

The ester, prepared according to the general procedure of Example 9 was recrystallized from benzene to afford a 64.8% yield of product, M.P. 190.5–192.5° C.

Analysis.—Calcd. for $C_{14}H_4O_4Cl_6$ (percent): C, 37.45; H, 0.90; Cl, 47.39. Found (percent): C, 37.73; H, 1.04; Cl, 47.04.

EXAMPLE 19

Bis(2,4-dinitro-6-methylphenyl) oxalate

The general procedure of Example 9 was used to prepare the ester which was recrystallized from 1:1 benzene-petroleum ether to obtain a 54% yield of product, M.P. 188.5–190°.

Analysis.—Calcd. for $C_{18}H_{14}N_4O_{12}$ (percent): C, 45.26; H, 2.24; N, 12.44. Found (percent): C, 42.66; H, 2.23; N, 12.64.

EXAMPLE 20

Bis(2,4-dinitro-5,6-dimethylphenyl) oxalate

The ester, prepared according to the general method of Example 9, was recrystallized from a benzenehexane (1:5) mixture. The product, M.P. 183–185°, was obtained in 14.8% yield.

Analysis.—Calcd. for $C_{18}H_{14}N_4O_{12}$ (percent): C, 35.20; H, 2.95. Found (percent): C, 44.96; H, 2.93.

EXAMPLE 21

Bis(3-trifluoromethylphenyl) oxalate

The ester, prepared by the general procedure, according to Example 9, was obtained in 20% yield, M.P. 53–56°.

*Analysis.*—Calcd. for $C_{16}H_8O_4F_6$ (percent): C, 50.81; H, 2.13; F, 30.14. Found (percent): C, 50.86; H, 2.22; F, 29.56.

EXAMPLE 22

Bis [3,5 bis(trifluoromethyl)phenyl] oxalate

In this example the general procedure of Example 9 was modified as follows. After the addition of oxalyl chloride to the phenol-triethylamine-benzene mixture. The reaction mixture was heated to reflux for five minutes, then stirred for 2 hours at 25° C. The crude ester was collected and washed in the usual manner followed by recrystallization from petroleum ether to obtain the ester M.P. 108–9°, yield 38.5%.

*Analysis.*—Calcd. for $C_{18}H_6O_4F_{12}$ (percent): C, 42.04; H, 1.18; F, 44.34. Found (percent): C, 41.70; H, 1.37; F, 44.15.

EXAMPLE 23

Bis(2-nitrophenyl) oxalate

Prepared according to the general procedure of Example 9, the ester, M.P. 186–8° was obtained in 48% yield.

*Analysis.*—Calcd. for $C_{14}H_8N_2O_8$ (percent): C, 50.61; H, 2.43; N, 8.43; O, 38.53. Found (percent): C, 50.90; H, 2.61; N, 8.50; O, 38.79.

EXAMPLE 24

Bis(2,5-dinitrophenyl) oxalate

The general procedure of Example 9 was followed to obtain the ester, M.P. 270–4° (dec.), in 66% yield.

*Analysis.*—Calcd. for $C_{14}H_6N_4O_{12}$ (percent): C, 39.83; H, 1.43; N, 13.27. Found (percent): C, 40.27; H, 1.63; N, 12.88.

EXAMPLE 25

Bis(2,4-dichlorophenyl) oxalate

In this example the general procedure of Example 9 was modified as follows. After the addition of the oxalyl chloride to the phenol-triethylamine-benzene solution the reaction mixture was maintained at reflux for 4.5 hours. The crude product was collected as usual, then washed with water, and recrystallized from petroleum ether. The yield of ester, M.P. 140–141.5 (lit. 144–5°)[2] was 38%.

[2] J. W. Baker and I. Schumaker op. cit.

*Analysis.*—Calcd. for $C_{14}H_6D_4Cl_4$ (percent): C, 44.25; H, 1.59; Cl. 37.32. Found (percent): C, 44.41; H, 1.69; Cl, 37.65.

EXAMPLE 26

Bis(2,6 dichloro-4-nitrophenyl) oxalate

The general procedure of Example 9 was followed with the exception of stirring the crude reaction mixture for 2 hours. The ester was recrystallized from petroleum to obtain a 14.8% yield of product, M.P. 223.5–224.5° C.

*Analysis.*—Calcd. for $C_{14}H_4N_2O_8Cl_4$ (percent): C, 45.20; H, 2.95. Found (percent): C, 44.96; H, 2.93.

TABLE XII.—SUMMARY OF OXALATE ESTER PROPERTIES

| Ester | Yield, percent | Melting point, degrees | Recrystallization solvent | Carbon Calcd. | Carbon Found | Hydrogen Calcd. | Hydrogen Found | Nitrogen Calcd. | Nitrogen Found | Halogen Calcd. | Halogen Found |
|---|---|---|---|---|---|---|---|---|---|---|---|
| Bis(pentafluorophenyl) oxalate. | 74 | 170–172 | Methylene chloride | 39.83 | 39.93 | | | | | 45.01 | 44.71 |
| Bis(2-formyl-4-nitrophenyl) oxalate. | 83 | 213.5–215 | Chlorobenzene | 49.50 | 49.28 | 2.08 | 2.19 | 7.23 | 7.43 | | |
| Bis(3-trifluoromethyl-4-nitrophenyl) oxalate. | 73 | 186–189 | Methylene chloride | 41.04 | 41.65 | 1.29 | 1.37 | 5.98 | 6.23 | | |
| Bis(2,4,6-trichlorophenyl) oxalate. | 64.8 | 190–192.5 | Benzene | 37.45 | 37.73 | 0.90 | 1.04 | | | 47.39 | 47.04 |
| Bis(2,4-dinitro-6-methylphenyl) oxalate. | 54 | 188.5–190 | Benzene petroleum ether (1:1). | 42.68 | 42.66 | 2.24 | 2.23 | 12.44 | 12.64 | | |
| Bis(2,4-dinitro-5,6-dimethylphenyl) oxalate. | 14.8 | 183–185 | Benzene-hexane (1:5) | 45.20 | 44.96 | 2.95 | 2.93 | | | | |
| Bis(3-trifluoromethylphenyl) oxalate. | 20 | 53–56 | Methylene chloride | 50.81 | 50.86 | 2.13 | 2.22 | | | 30.14 | 29.56 |
| Bis[3,5 bis(trifluoromethyl)-phenyl] oxalate. | 38.5 | 108–109 | Petroleum ether | 42.04 | 41.70 | 1.18 | 1.37 | | | 44.34 | ᵃ 44.15 |
| Bis(2-nitrophenyl) oxalate | 48 | 186–188 | Nitrobenzene | 50.61 | 50.90 | 2.43 | 2.61 | 8.43 | ᵇ 8.50 | | |
| Bis(2,5-dinitrophenyl) oxalate. | 66 | 270–274 d. | do | 39.83 | 40.27 | 1.43 | 1.63 | 13.27 | 12.88 | | |
| Bis(2,6 dichloro-4-nitrophenyl) oxalate. | 14.8 | 223.5–224.5 | Petroleum ether | 45.20 | 44.96 | 2.95 | ᶜ 2.93 | | | | |
| Bis(2,4-dinitrophenyl) oxalate. | 38 | 192–4 | Nitrobenzene | 39.83 | 39.97 | 1.43 | 1.65 | 13.27 | 13.47 | | |

ᵃ Reaction mixture heated to reflux for 5 minutes. Stirred 2 hours at 25°.
ᵇ Oxygen analysis calcd. 38.53. Found 38.79.
ᶜ Reaction mixture stirred for 2 hours at 25°.

EXAMPLE 27

This example illustrates the use of a water immiscible solvent in the chemiluminescent system.

A mixture of 25% dimethyl phthalate and 75% dibutyl Cellosolve was used as a solvent for a chemiluminescent reaction mixture consisting of $1 \times 10^{-2}$ M bis(2,4 dinitrophenyl) oxalate, $2 \times 10^{-2}$ M hydrogen peroxide and $2 \times 10^{-2}$ M rubrene. When this mixture was poured into a pan of water it floated on the top of the water, emitting a bright light.

When a chemiluminescent reaction mixture with dimethyl phthalate as the solvent and the same reactant concentrations was poured into a pan of water, it sank to the bottom of the pan, still emitting light.

EXAMPLE 28

This example illustrates the effect of delayed fluorescer addition to the reaction of an oxalate ester with a hydroperoxide.

The relationship between the chemiluminescent intermediate described in the preceding section and the fluorescer was investigated in a series of experiments where DPA was added at varying intervals to mixtures of DNPO and hydrogen peroxide in dimethylphthalate. The results are summarized in Table XIII. It is evident that substantial light emission occurs even when DPA addition is delayed as much as 70 minutes, while when the fluorescer is added initially to the same system less than 3% of the emission occurs beyond 70 minutes. Since infrared analysis indicates that the starting ester is completely consumed within about 6 minutes in this system in the absence of DPA, it is again clear that a chemiluminescent intermediate exists and that it is reasonably long-lived in the absence of fluorescer. It is also clear that the fluorescer acts as a catalyst for the decomposition of the chemiluminescent intermediate in the excitation step.

TABLE XIII.—EFFECT OF DELAYED FLUORESCER ADDITION

| Fluorescer addition time [a] (min.) | Quantum yield [b] (Einstein mole×$10^2$) | Relative quantum yield (percent) | Relative quantum yield in standard reaction (percent) |
|---|---|---|---|
| 0 | 7.9 | 100 | 100 |
| 27 | 6.0 | 79 | 27 |
| 70 | 4.2 | 53 | <2 |

[a] The time elapsed between the mixing of ester with hydrogen peroxide and the addition of fluorescer.
[b] The reaction with 0.01 M bis(2,4-dinitrophenyl) oxalate DNPO, 0.082 M hydrogen peroxide and 6×$10^{-4}$ M 9,10-diphenylanthracene in dimethyl phthalate at 25°.
[c] In the standard reaction, the fluorescer addition time is zero. The related quantum yield is calculated for any fluorescer addition time as a portion of quantum yield of the standard reaction obtained after the elapse of reaction time equal to the fluorescer addition time.

EXAMPLE 29

Bis-2,4-dinitrophenyl oxalate and oxalylchloride were compared in chemiluminescent systems and the results are shown in Table XIV.

Bis-2,4-dinitrophenyl oxalate is shown in Table XIV to be superior to oxalylchloride at even low concentrations in terms of chemiluminescent lifetime, efficiency and radiation capacity. However, practical applications require a high concentration of the chemiluminescent reactant. At TABLE XIV.—CHEMILUMINESCENCE DATA OF OXALYLCHLORIDE VERSUS BIS-2,4-DINITROPHENYL OXALATE SYSTEM IN DIMETHYL-PHTHALATE SOLUTION [a]

| Reactant | | $t\frac{1}{4}I_{max}$ [b] min. | $I_{max}$ [c] min. | Quantum yield, Einstein mole$^{-1}$×$10^2$ | Radiation capacity, Einstein $l^{-1}$×$10^4$ |
|---|---|---|---|---|---|
| Type | Mole $l^{-1}$ | | | | |
| Oxalylchloride | 1.3×$10^{-2}$ | 2 | 0.32 | 5.1 | 0.6 |
| Do | 1×$10^{-1}$ | Fluorescence quenching and destruction of fluorescer occurs | | | |
| DNPO | 1.1×$10^{-2}$ | 13 | 0.118 | 13.2 | 1.47 |
| DNPO | 1×$10^{-1}$ | 4 | 3.05 | 7.4 | 7.4 |

[a] $H_2O_2$:0.1 mole $l^{-1}$, 9,10-diphenylanthracene:5×$10^{-4}$ mole $l^{-1}$.
[b] $t\frac{1}{4}I_{max}$=time required for the light intensity to decrease to one quarter of its maximum value.
[c] $I_{max}$=maximum value of emitted light intensity.

high concentration this superiority of bis-2,4-dinitrophenyl oxalate is further augmented because of the concentration quenching and the fluorescer destroying properties of oxalylchloride.

EXAMPLE 30

In this example, an aliphatic oxalic-type ester was prepared and tested in a number of chemiluminescent systems. The tests and results are shown in Table XV.

Bis(1,1,1,3,3,3-hexafluoro-2-propyl)oxalate. The product was prepared by the procedure described earlier in Example 13 for the preparation of oxalic esters. The product was distilled at 26.5° (0.6 mm. Hg) to obtain 7 g. (24%) of colorless liquid.

TABLE XV.—QUALITATIVE CHEMILUMINESCENCE TESTS WITH BIS(1,1,1,3,3,3-HEXAFLUORO-2-PROPYL)OXALATE Tests [a]

| A | A[1] | B | C | D |
|---|---|---|---|---|
| Anhydrous $H_2O_2$ | $H_2O_2$+ TBAP | $H_2O_2$+($CH_3CH_2$)$_3$N | $H_2O_2$+ $H_2O$ | $H_2O_2$+ MSA |
| W | W | M | W | None |

[a] The tests were carried out as follows:
   A. 20 mg. of the test compound was added to a solution of ~2 mg. rubrene in 5 ml. of dimethyl phthalate (DMP) solvent. 0.25 ml. of 5.0 M $H_2O_2$ solution was then added.
   A[1]. As test A except that ~20 mg. of tetrabutylammonium perchlorate (TBAP) was added.
   B. 20 mg. of the test compound was added to a solution of ~2 mg. rubrene and 1 drop of 0.01 M ($CH_3CH_2$)$_3$N solution in 5 ml. DMP solvent. 25 ml. of 5.0 M $H_2O_2$ solution was then added.
   C. 20 mg. of the test compound was added to a solution of ~2 mg. rubrene in 5 ml. of DMP solvent saturated with $H_2O$. 0.25 ml. of 5.0 M $H_2O_2$ solution was then added.
   D. 20 mg. of the test compound was added to a solution of ~2 mg rubrene and 2 drops of 0.1 M MSA solution in 5 ml. of DMP solvent. 0.25 ml. of 5.0 M $H_2O_2$ solution was then added.

NOTE.—The concentrations employed in the tests (approximate) were: 1×$10^{-2}$ M ester, 2×$10^{-1}$ M $H_2O_2$, 8×$10^{-4}$ M rubrene, 1×$10^{-2}$ M TBAP, 5×$10^{-5}$ M ($CH_3CH_2$)$_3$N, 1×$10^{-3}$ M methyl sulfonic acid (MSA). Tests A, A[1], B, and C remained visible for more than 30 minutes.

EXAMPLE 31

In this example, the chemiluminescent activity of various oxalate esters was compared and correlated with the degree of acidity of the compounds, i.e. the pKa constant. The results are shown in Table XVI.

TABLE XVI.—EFFECT OF LEAVING GROUP ACIDITY ON CHEMILUMINESCENCE

| | | | | | Quantum yield [c] ($10^2$ Einstein mole$^{-1}$) | | | |
|---|---|---|---|---|---|---|---|---|
| | | | | | DPA | | Rubrene | |
| Compound [a] | pKa of phenol [d] | Intensity without additives [d] | Effect of base on 120 min. light yield | Additives [d] | 0.001 M | 0.01 M | 0.001 M | 0.01 M |
| Phenyl oxalate | 9.89 | Weak | Large increase | $Et_3N$ | 1 | | | |
| 3-($CF_3$) | 8.87 | do | do | None | [e]7 | | | |
| 4-(CN) | 7.95 | do | do | BTAH | 4 | 2 | | |
| 2,4-($Cl$)$_2$ | 7.85 | do | do | BTAH | 6 | 6 | | |
| 3,5-($CF_3$)$_2$ | 7.83 | do | do | BTAH | 6 | 3 | | |
| 2-($NO_2$) | 7.21 | do | do | None | [b]1 | | | |
| 4-($NO_2$) | 7.15 | do | do | $Et_3N$ [f] | | | | [h]7 |
| 2,4,5-($Cl$)$_3$ | 7.06 | do | do | TBAP | | 6 | | 20 |
| 2,4,6-($Cl$)$_3$ | 6.37 | Medium | do | None | 12 | 6 | | [i]8 |
| 4-($NO_2$)-3-($CF_3$) | 6.10 | Strong | Little change | do | 14 | 9 | | 14 |
| 4-($N_2$)-2-($CHO$) | 5.48 | do | do | do | 5 | | | |
| 2,5-($NO_2$)$_2$ | 5.22 | do | do | do | 15 | | | |
| ($Cl$)5 | 4.72 | do | do | do | | 7 | | [i]6 |
| 2,4-($NO_2$)$_2$-6-($CH_3$) | 4.18 | do | do | do | | | | |
| 4-($NO_2$)-2,6-($Cl$)$_2$ | 4.12 | Weak | Large increase | BTAH | 1 | 3 | | |
| 2,4-($NO_2$)$_2$ | 4.07 | Strong | Little change | None | 17 | 9 | 2.4 | 16 |

[a] Phenyl substituents on diphenyl oxalate.
[b] In aqueous solution (pKa=the negative of the log of the ionization constant).
[c] Quantum yield based on oxalate. Reactions in dimethyl phthalate (DMP) except where noted at 25°.
[d] $Et_3N$ is triethyl amine at 3.3×$10^{-4}$ M. BTAH is benzyltrimethylammonium hydroxide at 1.6×$10^{-4}$ M. TBAP is tetrabutylammonium perchlorate at 0.067 M.
[e] Ester concentration was 3.3×$10^{-4}$ M.
[f] Ester concentration was 6.67×$10^{-4}$ M.
[g] Trimethylamine at 8.3×$10^{-3}$ M.
[h] DMP contained 16% benzene by volume.
[i] Solvent was triethyl phosphate.
[j] Solvent was 50% DMP-50% benzene by volume.

Comparison of the compounds in Table XVI indicates that the basic

structure must be substituted with groups rapidly displaced by H for optimum efficiency.

Since the activity of a group toward displacement by active nucleophiles, such as hydrogen peroxide, increases, in general, with increasing acidity of the group, there is a general correlation between the acidity of the aryl substituents in aryl oxalates with chemiluminescent intensity and lifetime. The relationship is illustrated in Table XVI. It appears, in general, that oxalate esters of strongly acidic alcohols having pKa's smaller than about 6.2 generate strong chemiluminescence in the absence of additives, while oxalates derived from moderately acidic alcohols having pKa's between about 6.2 and 8 require catalysis for reasonable intensity and short lifetimes. Oxalates of alcohols having pKa's between about 8 and 10 give medium to weak chemiluminescence with basic catalysis, while chemiluminescence is very weak from oxalates of still less acidic alcohols.

It is within the scope of this invention to form an apparatus or article such as a container which, for example, may be either (1) a substantially insoluble, (2) a rupturable or alternatively, (3) a dissolvable capsule in which a reaction component or composition of this invention is substantially enclosed for subsequent reaction with other ingredients necessary to produce chemiluminescent light, or in which all of the ingredients are present in a manner so as to prevent reaction, such as in separate containers from which, or within which they may be admixed to produce chemiluminescence. It is to be understood that the examples illustrating this invention are not intended to limit the invention, and that it is within the scope of this invention to make such modifications of the compositions and processes disclosed herein as would be obvious to a person of ordinary skill in this art, without departing from the spirit of the disclosure or the scope of the appended claims.

We claim:

1. A chemiluminescent light composition for reaction with a hydroperoxide to produce chemiluminescent light, said composition comprising (a) an ester of the formula:

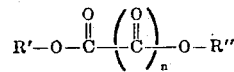

wherein said R' and R'' are unsubstituted or substituted aliphatic or aromatic groups and $n$ is an integer at least 1, (b) an organic fluorescent compound having a spectral emission from about 330 to 1000 mm., and (c) at least one solvent for said ester and fluorescent compound.

2. The chemiluminescent light composition of claim 1 wherein said ester is an ester of an oxalic acid and an alcohol, said alcohol being characterized by an acid ionization constant in water greater than $1.3 \times 10^{-10}$.

3. The chemiluminescent light composition of claim 2 wherein said ester is formed from oxalic acid and phenol.

4. The chemiluminescent light composition of claim 1 wherein said hydroperoxide is hydrogen peroxide.

5. The chemiluminescent light composition of claim 3 wherein said hydroperoxide is hydrogen peroxide.

6. The chemiluminescent composition of claim 5 wherein said ester compound is bis(2,4-dinitrophenyl) oxalate.

7. The chemiluminescent composition of claim 5 wherein said ester compound is bis(2,4,6 - trichlorophenyl) oxalate.

References Cited

UNITED STATES PATENTS

| 542,524 | 7/1895 | Hutchinson | 252—143 |
| 3,329,621 | 7/1967 | Rauhut | 252—188.3 |

JOHN D. WELSH, Primary Examiner

U.S. Cl. X.R.

252—188.3, 301.2, 408; 260—485

UNITED STATES PATENT OFFICE
CERTIFICATE OF CORRECTION

Patent No. 3,597,362            Dated August 3, 1971

Inventor(s)     Laszlo Joseph Bollyky et al.

It is certified that error appears in the above-identified patent and that said Letters Patent are hereby corrected as shown below:

Table V, first section heading, second line, delete "$H_2O$" and insert -- $H_2O_2$ --. Table XVI, second section heading, "pKa of phenol[d]" should read -- pKa of phenol[b] --. Table XVI, third section heading, "Intensity without additives" delete "d" at the end. Table XVI, in the line that read "$4-(NO_2)$..." delete "b" and insert -- f --. Table XVI, footnote b, "negati-e" should read -- negative --.

Signed and sealed this 11th day of April 1972.

(SEAL)
Attest:

EDWARD M. FLETCHER, JR.          ROBERT GOTTSCHALK
Attesting Officer                Commissioner of Patents